US012685687B2

(12) United States Patent
Wang et al.

(10) Patent No.: US 12,685,687 B2
(45) Date of Patent: Jul. 21, 2026

(54) EXOSKELETON JOINT SELF-LOCKING MECHANISM, KNEE JOINT, AND BIONIC REHABILITATION ROBOT

(71) Applicant: SHANGHAI FOURIER INTELLIGENCE CO., LTD, Shanghai (CN)

(72) Inventors: Jun Wang, Huai'an City (CN); Tongchen Wang, Shanghai (CN); Danping Xiao, Nankang City (CN); Jie Gu, Shanghai (CN); Chong Li, Shanghai (CN)

(73) Assignee: SHANGHAI FOURIER INTELLIGENCE CO., LTD, Shanghai (CN)

( * ) Notice: Subject to any disclaimer, the term of this patent is extended or adjusted under 35 U.S.C. 154(b) by 897 days.

(21) Appl. No.: 17/923,020

(22) PCT Filed: Mar. 19, 2021

(86) PCT No.: PCT/CN2021/081710
§ 371 (c)(1),
(2) Date: Nov. 3, 2022

(87) PCT Pub. No.: WO2022/068154
PCT Pub. Date: Apr. 7, 2022

(65) Prior Publication Data

US 2023/0218464 A1 Jul. 13, 2023

(30) Foreign Application Priority Data

Sep. 29, 2020 (CN) ......................... 202011046110.3

(51) Int. Cl.
*A61H 1/02* (2006.01)
*A61H 3/00* (2006.01)

(52) U.S. Cl.
CPC ........... *A61H 1/024* (2013.01); *A61H 1/0266* (2013.01); *A61H 3/00* (2013.01);
(Continued)

(58) Field of Classification Search
CPC ........ A61H 1/024; A61H 3/00; A61H 1/0237; A61H 1/0262; A61H 2201/0192;
(Continued)

(56) References Cited

U.S. PATENT DOCUMENTS

| | | | | |
|---|---|---|---|---|
| 1,866,481 A * | 7/1932 | Norton | .................... | F16D 51/22<br>74/567 |
| 5,282,460 A * | 2/1994 | Boldt | ....................... | B25J 9/146<br>403/119 |

(Continued)

FOREIGN PATENT DOCUMENTS

| | | |
|---|---|---|
| CN | 2203726 Y | 7/1995 |
| CN | 1286187 A | 3/2001 |

(Continued)

OTHER PUBLICATIONS

PE2E Translation JP 619_ JP_6149254_B2_H. (Year: 2017).*
(Continued)

*Primary Examiner* — Victoria Murphy
*Assistant Examiner* — Sydney Reyes Russell
(74) *Attorney, Agent, or Firm* — HAUPTMAN HAM, LLP

(57) ABSTRACT

An exoskeleton joint self-locking mechanism, a knee joint and a bionic rehabilitation robot are provided. The self-locking mechanism comprises a first base, a rotating outward expanding locking member, a second base and a locking driving member; the rotating outward expanding locking member comprises a first rotating frame and a second rotating frame, and outer sides of the first rotating frame and the second rotating frame have a first friction
(Continued)

surface; one end of the first rotating frame is pivoted with one end of the second rotating frame; the second base is rotationally mounted on the first base, and an inner wall of the second base defines a second friction surface enclosing the first friction surface; the locking driving member applies/removes a force pushing away from free ends of the first rotating frame and the second rotating frame, to make the first friction surface lock/unlock the second friction surface.

16 Claims, 9 Drawing Sheets

(52) U.S. Cl.
CPC .................. *A61H 2003/007* (2013.01); *A61H 2201/0192* (2013.01); *A61H 2201/1207* (2013.01); *A61H 2201/1454* (2013.01); *A61H 2201/164* (2013.01); *A61H 2201/165* (2013.01); *A61H 2201/1664* (2013.01); *A61H 2201/1671* (2013.01); *A61H 2201/1676* (2013.01); *A61H 2201/5058* (2013.01); *A61H 2201/5092* (2013.01)

(58) Field of Classification Search
CPC .................... A61H 1/02; A61H 1/0244; A61H 2201/12-123; B25J 9/0006; A61F 2/64-646; A61F 2002/6818; A61F 2002/6845; A61F 2002/6854; A61F 5/0102-0111; A61F 2005/0155-0158; A61F 2005/0165; F16D 51/46-50; F16D 51/60-62; F16D 51/18-22
See application file for complete search history.

(56) References Cited

U.S. PATENT DOCUMENTS

| | | | | |
|---|---|---|---|---|
| 12,330,293 | B1 * | 6/2025 | Churchill | F16D 65/065 |
| 2002/0025893 | A1 | 2/2002 | Pellis | |
| 2007/0151818 | A1 * | 7/2007 | Linhoff | F16D 65/14 188/162 |
| 2010/0125229 | A1 | 5/2010 | Rudolph et al. | |
| 2011/0066088 | A1 * | 3/2011 | Little | A61H 1/0255 601/35 |
| 2015/0173929 | A1 * | 6/2015 | Kazerooni | A61H 1/00 602/16 |
| 2018/0058526 | A1 * | 3/2018 | Lee | B60T 7/107 |
| 2019/0091096 | A1 * | 3/2019 | Patel | A61H 7/005 |

FOREIGN PATENT DOCUMENTS

| | | | | | |
|---|---|---|---|---|---|
| CN | 101083423 | B | * | 7/2010 | |
| CN | 103260576 | A | | 8/2013 | |
| CN | 104822346 | A | | 8/2015 | |
| CN | 106236517 | A | * | 12/2016 | A61H 3/00 |
| CN | 106321690 | A | * | 1/2017 | F16D 51/24 |
| CN | 206630847 | U | | 11/2017 | |
| CN | 107928995 | A | | 4/2018 | |
| CN | 108742967 | A | | 11/2018 | |
| CN | 106321690 | B | | 1/2019 | |
| CN | 210872826 | U | | 6/2020 | |
| CN | 210889836 | U | | 6/2020 | |
| EP | 2198810 | A1 | | 6/2010 | |
| JP | H06214651 | A | * | 8/1994 | |
| JP | 6149254 | B2 | * | 6/2017 | |
| WO | 2014039134 | A1 | | 3/2014 | |
| WO | 2018236225 | A1 | | 12/2018 | |

OTHER PUBLICATIONS

PE2E Translation Gao CN_101083423_B_H (Year: 2010).*
EspaceNet Translation_Kang_CN106321690 (Year: 2017).*
EspaceNet Translation_Peng_CN_106236517 (Year: 2016).*
EspaceNet Translation Shiomi JP_H06214651 (Year: 1994).*
Anaheim, Article: Linear Actuators Guide, Jul. 7, 2019 (Year: 2019).*
The first office action issued in corresponding CN application No. 202011046110.3 dated Nov. 24, 2020.
The second office action issued in corresponding CN application No. 202011046110.3 dated Dec. 17, 2020.
Extended European search report issued in corresponding European application No. 21873821.9 dated Mar. 14, 2024.
WIPO, International Search Report and Written Opinion for International Application No. PCT/CN2021/081710, Jun. 24, 2021.

* cited by examiner

EXOSKELETON JOINT SELF-LOCKING MECHANISM, KNEE JOINT, AND BIONIC REHABILITATION ROBOT

FIELD OF TECHNOLOGY

The present invention relates to the technical field of medical rehabilitation devices, in particular to an exoskeleton joint self-locking mechanism, a knee joint and a bionic rehabilitation robot.

BACKGROUND

With the continuous development of medical science and technology, rehabilitation therapy has become a new therapeutic discipline to promote the rehabilitation of physical and mental functions of patients and disabled people, and it is also a new technical specialty. Its purpose is to enable people to resume their daily life, study, work and labor, as well as social life as possible, integrate into society and improve their quality of life.

Patients with limb loss of mobility and muscle atrophy due to cerebrovascular diseases, brain trauma and other causes often rely on external forces to assist them in standing and walking for rehabilitation treatment. Therefore, rehabilitation robot technologies such as walking aids have been widely developed in the world, such as:

① Knee joint structure with self-locking function: "Hebei University of Technology", "A wearable lower limb walking aid exoskeleton imitating human knee joint movement curve", patent number CN210872826U:

For the knee joint of such lower limb aid exoskeleton, after the thigh motor is started, the rotation is transmitted to the thigh torque sensor through the first connecting flange of the thigh, the thigh torque sensor drives the second connecting flange of the thigh to rotate, and the output end of the second connecting flange of the thigh transmits power to the lead screw; through the back and forth rotation of the lead screw, the slide on the lead screw is driven to move up and down, so that the thigh auxiliary support drives the shank main support to expand and contract, thus realizing the rotation of the knee joint. Although the knee joint with this structure has a self-locking function, it has large weight and size. As far as the power of the motor selected for the knee joint, energy consumption is large, and the electrified endurance time of the whole machine is short.

② "MEBOTX INTELLIGENT TECH SUZHOU CO., LTD.", "A lower limb load-bearing assisting exoskeleton capable of achieving rapid self-locking in standing state", patent application publication number CN 111409060 A:

The locking mechanism in the patent comprises a driver, a node box, a fixing seat, a spring, a locking pin, a manual switch assembly, a path cover, a locking handle, a cable sleeve upper joint, a cable steel rope, a cable sleeve and a locking hole.

When the joint needs to be locked, the wearer presses the switch located elsewhere, and the main control device may send a signal to the node box, and the node box controls an end round bar of the driver to be pushed out upward. After the end round bar is pushed out upward, the locking pin can be pushed out; at this time, the spring is compressed, and the end of the locking pin is inserted into the locking hole. After the activation state of the locking unit is completed, the driver can be powered off. Due to the internal screw structure, the end round bar at the end of the driver can realize linear self-locking, that is, the locking pin cannot be retracted. In addition, the wearer can manually pull the handle to drive the cable steel rope to pull the top post at the lower end of the steel rope, thereby pushing out the locking pin to realize locking.

This knee joint structure can only be locked and unlocked by manual or remote control. The locking and unlocking of the joint of a patient during walking require frequent human control intervention, and cannot be controlled automatically and intelligently. The complicated operation can easily lead to manipulation errors, which cannot protect the safety of the wearer. Moreover, the user experience is poor, and it is impossible to realize the high bionics of the human walking state.

③ "University of California" "A controllable passive artificial knee", patent application publication number CN 104822346 A:

In this patent, one end of a torsion spring is sleeved on a disk body, the other end is sleeved on a rotating shaft of a shank connector, and a radius of the torsion spring is slightly smaller than the disk body. The disk body is fixed on the cover body to ensure that the torsion spring does not rotate around the disk body. The leading end of the torsion spring passes through the hole in the rod of the brake. Therefore, when the brake controls the rod to stretch out and draw back, the leading end may also move, which causes the torsion spring to be compressed or stretched, thereby pressing or loosening the rotating shaft. In this way, a resistance distance is generated between the thigh connector and the shank connector, thus realizing the function of locking and unlocking the knee joint. In the example described in the patent, the brake is controlled by an angle sensor, which determines the working state of the brake by sensing the swing amplitude of the wearer's thigh and controls the unlocking and locking of the knee joint.

Given the shortcomings in the prior art, the present invention came into being.

SUMMARY

Given the above situation, in an exoskeleton robot, removing the power device at the knee joint (such as motor set and hydraulic cylinder) can reduce the power consumption of the whole machine, extend the battery pack useful time and improve the endurance of the whole machine. It can also reduce the weight of the whole machine and bring many benefits such as cost reduction. Further, the introduction of locking and unlocking function in the knee joint can greatly improve the safety of the exoskeleton. Therefore, the present invention provides an exoskeleton joint self-locking mechanism, a bionic knee joint and a bionic rehabilitation robot. The exoskeleton joint self-locking mechanism disclosed in the primary part of the present invention comprises:

- a first base having a first compartment;
- a rotating outward expanding locking member disposed in the first compartment, the rotating outward expanding locking member comprising a first rotating frame and a second rotating frame, and an outer side of the first rotating frame and an outer side of the second rotating frame correspondingly having a first friction surface; and one end of the first rotating frame being pivoted with one end of the second rotating frame, and another end of the first rotating frame and another end of the second rotating frame being relatively free ends;
- a second base having a second compartment; the second base being rotationally mounted on the first base, and an inner wall of the second compartment enclosing the rotating outward expanding locking member and defining a second friction surface matching with the first friction surface; and the locking driving member capable of applying/removing a force pushing away from the free end of the first rotating frame and the free end of the second rotating frame, to make the first friction surface close contact to lock/unlock the second friction surface.

By adopting the above technical solution, the present invention has the following technical effects:

According to the present invention, the first base and the second base are rotatably installed, and then the first base and the second base are fixed on the limb of the joint, thereby realizing flexible rotation at the joint; then, a mutual friction surface is formed between the rotating outward expanding locking member on the first base and the inner wall of the second base. In an initial state, the first rotating frame, the second rotating frame and the first base do not contact or generate self-locking friction force; when turning to a self-locking state, the locking driving member drives the rotating outward expanding locking member to expand outward, so that the friction surface is in contact and self-locked; the driving is progressive, so a magnitude of the friction force is also progressive; the knee joint is locked and unlocked by controlling the friction force so that the unlocking and locking of the knee joint are not completed instantaneously, and it is gradually locked and unlocked with the increase and decrease of friction force, which is more in line with the activity habits of the joint and safer.

Further, the free end of the first rotating frame and/or the free end of the second rotating frame are correspondingly provided with a stress slope surface, the locking driving member is provided with a telescopic locking portion, which has a force applying slope surface, and the force applying slope surface applies force to the stress slope surface along with the telescopic locking portion. During the sliding of the stress slope surface and the force applying slope surface against each other, the force applying slope surface applies a force to the stress slope surface to separate the first rotating frame from the second rotating frame.

Further, an inverted trapezoidal space is formed between the stress slope surface of the first rotating frame and the stress slope surface of the second rotating frame, and a shape of the telescopic locking portion matches with the inverted trapezoidal space. The inverted trapezoidal space defined by the first rotating frame and the second rotating frame can make the force more uniform.

Further, the first base is also provided with a chute, the locking driving member includes a driving motor, and the telescopic locking portion is a locking slider disposed in the chute; a driving end of the driving motor is provided with a threaded segment, the locking slider is provided with a threaded groove, and the threaded segment is inserted into the threaded groove. The driving motor is enabled to accurately adjust the rotation of the threaded segment through a reduction gearbox, thus accurately adjusting the advance and retreat of the locking slider, so that the whole self-locking process is smooth and natural.

Further, the second base is mounted to the first base through a mounting mechanism, and the mounting mechanism comprises:

a mounting groove provided on the second base;

a bearing, an outer ring of the bearing being fixedly mounted in the mounting groove; and a rotating shaft disposed in the first compartment of the first base, and an inner ring of the bearing being fixedly mounted on the rotating shaft.

It facilitates the relative rotation of the first base and the second base without axial translocation, and the rotation is smooth and stable.

Further, the free end of the first rotating frame and the free end of the second rotating frame are connected to each other through an elastic return member.

The present invention also discloses an exoskeleton knee joint, characterized in comprising a shank connecting rod, a thigh connecting rod and the abovementioned exoskeleton joint self-locking mechanism; the shank connecting rod is connected to the first base, and the thigh connecting rod is connected to the second base. The self-locking mechanism is disposed at the knee joint, which can start the locking driving member to complete the self-locking to assist standing when standing, and can unlock when walking to complete the activities at the knee joint.

The present invention also discloses an exoskeleton bionic rehabilitation robot, characterized in comprising the abovementioned exoskeleton knee joint and an ankle-foot component that is connected to the shank connecting rod of the exoskeleton knee joint. As mentioned above, the locking driving member can be started to complete self-locking to assist standing when standing, and the activities at the knee joint can be unlocked when walking.

Further, the exoskeleton bionic rehabilitation robot also includes a control unit, which comprises:

a control motherboard being in control connection to the locking driving member; and a ranging sensor disposed on the ankle-foot component to measure a distance between the ankle-foot component and a walking surface, and the ranging sensor being in signal connection to the control motherboard.

A distance between the foot and the walking surface (i.e., the ground) is measured to determine whether the leg walks or stands. When standing, the distance between the ranging sensor and the walking surface is the smallest, and self-locking is performed to assist standing; when the distance between the ranging sensor and the walking surface becomes larger, it is in the state of walking or preparing to walk, and activities of the knee joint are completely by the progressive unlocking.

Further, the ranging sensor includes, but is not limited to, an infrared ranging sensor, a laser ranging sensor, an ultrasonic ranging sensor, and a radar ranging sensor. The ranging sensor is designed to measure the distance between the ankle-foot component and the walking surface to determine whether the leg is standing or lifting from the ground to prepare for walking.

Further, the exoskeleton bionic rehabilitation robot also includes a locking measuring mechanism, which comprises:

a synchronous shaft rotating synchronously with the driving shaft of the driving motor;

a signal transmitter and a signal receiver arranged opposite to each other at intervals;

a measuring turntable, a rotation center of the measuring turntable being connected to the synchronous shaft, and an edge of the measuring turntable being alternately provided with a signal masked area and a signal unmasked area; and the measuring turntable rotating with the synchronous shaft to circularly block/switch on the signal connection between the signal transmitter and the signal receiver.

By synchronizing the driving shaft with the synchronous shaft, the measuring turntable also rotates, a number of times that the signal transmitter and signal receiver go through the signal masked area and the signal unmasked area till realizing the self-locking state is counted, so that an angle at which the measuring turntable has turned can be read and recorded, which can prevent an excessive rotation of the driving motor from damaging other parts, and can also control the time to reach this angle, so that a speed of self-locking can be controlled, and the bionic real knee joint movement can be improved for comfort and safety.

Further, the signal transmitter and the signal receiver are a set of infrared transceiver photodiode pairs.

Further, the measuring turntable is a raster encoder.

Further, the driving motor is a coaxial motor, and the synchronous shaft and the driving shaft of the driving motor are configured to be coaxial but at two different ends.

| | |
|---|---|
| first base | 1 |
| first compartment | 12 |
| lug | 13 |
| hole | 131 |
| pivot mounting shaft | 132 |
| second base | 2 |
| second friction surface | 20 |
| second compartment | 21 |
| angle limiting block | 11 |
| first friction surface | 30 |
| first rotating frame | 31 |
| stress slope surface | 311 |
| inverted trapezoidal space | 312 |
| chute | 313 |
| groove | 341 |
| second rotating frame | 32 |
| brake pad | 33 |

-continued

| | |
|---|---|
| elastic return member | 34 |
| outer cover plate | 4 |
| rotating shaft | 51 |
| bearing | 52 |
| clamp spring | 53 |
| driving motor | 61 |
| miniature DC motor | 611 |
| reduction gearbox | 612 |
| mounting bearing | 613 |
| threaded segment | 614 |
| locking slider | 62 |
| force applying slope surface | 621 |
| raster encoder | 71 |
| signal masked area | 711 |
| signal unmasked area | 712 |
| infrared transceiver photodiode pairs | 72 |
| control motherboard | 73 |
| synchronous shaft | 74 |
| shank connecting rod | 8 |
| ankle-foot component | 9 |
| ranging sensor | 91 |
| ranging sensor bracket | 92 |
| third base | 93 |
| fourth base | 94 |
| ankle-foot rotating shaft | 95 |
| ankle-foot bearing | 96 |

DETAILED DESCRIPTION OF THE EMBODIMENTS

Embodiments of the present invention are described below by way of specific examples, and other advantages and effects of the present invention will be readily apparent to those skilled in the art from the disclosure of this description. The present invention may also be practiced or applied by other different embodiments, and the details of this description may be modified or changed in various ways without departing from the essence of the present invention, based on different views and applications.

Figure 1:
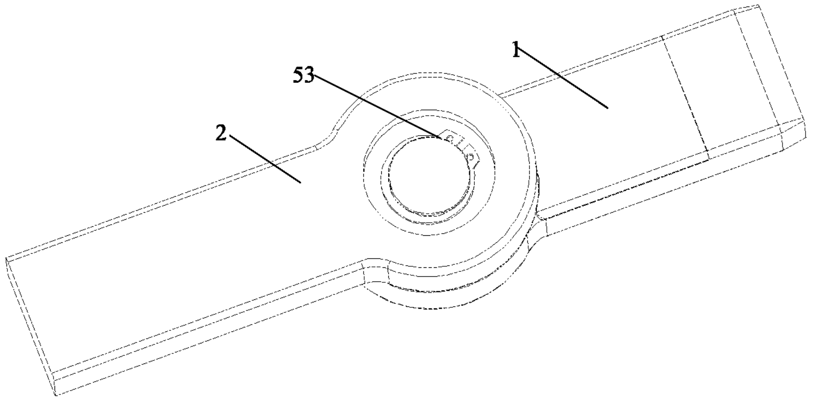
FIG. 1 is a structural schematic diagram of an exoskeleton joint self-locking mechanism of the present invention.
Figure 2:
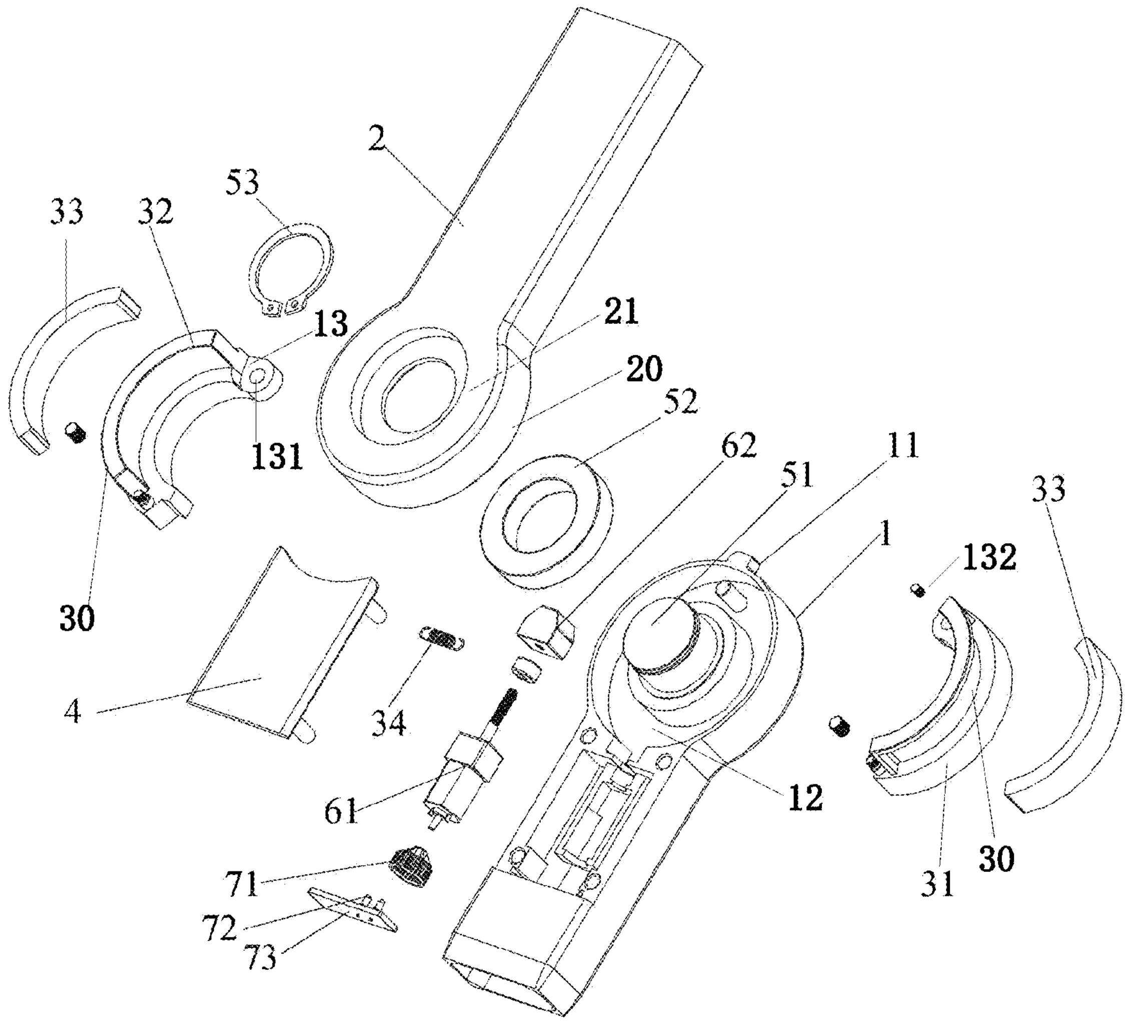
FIG. 2 is an exploded view of the exoskeleton joint self-locking mechanism of the present invention.
Figure 3:
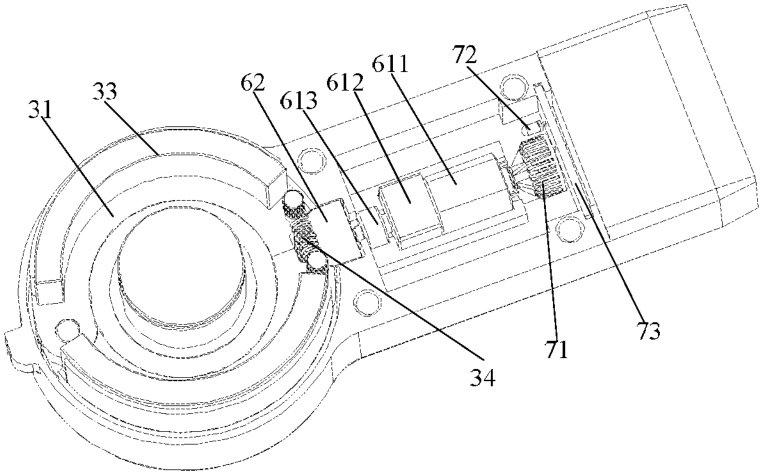
FIG. 3 is a structural diagram of a first base in the exoskeleton joint self-locking mechanism of the present invention.

Referring to FIG. 1, FIG. 2 and FIG. 3, the present invention primarily provides an exoskeleton joint self-locking mechanism, which comprises a first base 1, a rotating outward expanding locking member, a second base 2 and a locking driving member, wherein the first base 1 has a first compartment 12; the rotating outward expanding locking member is disposed in the first compartment 12, the rotating outward expanding locking member comprises a first rotating frame 31 and a second rotating frame 32, and an outer side of the first rotating frame 31 and an outer side of the second rotating frame 32 are correspondingly provided with a first friction surface 30; one end of the first rotating frame 31 is pivoted with one end of the second rotating frame 32, and another end of the first rotating frame 31 and another end of the second rotating frame 32 are relatively free ends; the second base 2 has a second compartment 21; the second base 2 is rotatably mounted on the first base, and an inner wall of the second compartment 21 encloses the rotating outward expanding locking member and defines a second friction surface 20 matching with the first friction surface 30; and the locking driving member can apply/remove a force pushing away from the free end of the first rotating frame 31 and the free end of the second rotating frame 32, to make the first friction surface 30 close contact to lock/unlock the second friction surface 20. According to the present invention, the first base 1 and the second base 2 are rotatably installed, and then the first base 1 and the second base 2 are fixed on the limb of the joint, thereby realizing flexible rotation at the joint; then, mutual friction surfaces are formed between the rotating outward expanding locking member on the first base 1 and the inner wall of the second base 2. In an initial state, the first rotating frame 31, the second rotating frame 32 and the first base do not contact or generate self-locking friction force; when turning to a self-locking state, the locking driving member drives the rotating outward expanding locking member to expand outward, so that the friction surfaces are in contact and self-locked; the driving is progressive, so a magnitude of the friction force is also progressive; the knee joint is locked and unlocked by controlling the friction force, so the unlocking and locking of the knee joint are not completed instantaneously, but gradually locked and unlocked with the increase and decrease of friction force, which is more in line with the activity habits of the joint and safer.

The following is described in detail by way of specific embodiments in conjunction with the accompanying drawings:

As for a pivoting of the first rotating frame 31 and the second rotating frame 32, the implementation structure in this embodiment is represented as the end of the first rotating frame 31 and the end of the second rotating frame 32 are correspondingly provided with a lug 13, two lugs 13 are provided with holes 131, and the two lugs 13 are stacked together and then inserted and mounted by a pivot mounting shaft 132.

The design at the joint should favor the space utilization, make the overall component space layout reasonable and compact, and reduce the overall size so that the force applied by the locking driving member is divided and decomposed by two acting surfaces. Specifically, the free end of the first rotating frame 31 and/or the free end of the second rotating frame 32 are correspondingly provided with a stress slope surface, the locking driving member is provided with a telescopic locking portion, the telescopic locking portion has a force applying slope surface 621, and the force applying slope surface 621 applies force to the stress slope surface along with the telescopic locking portion. In this way, when the stress slope surface and the force applying slope surface 621 slide against each other, the force applying slope surface 621 applies a force to the stress slope surface to separate the first rotating frame 31 from the second rotating frame 32, so that the overall structure is flattened, which is more suitable for wearing and mounting at the joint.

Figure 4:
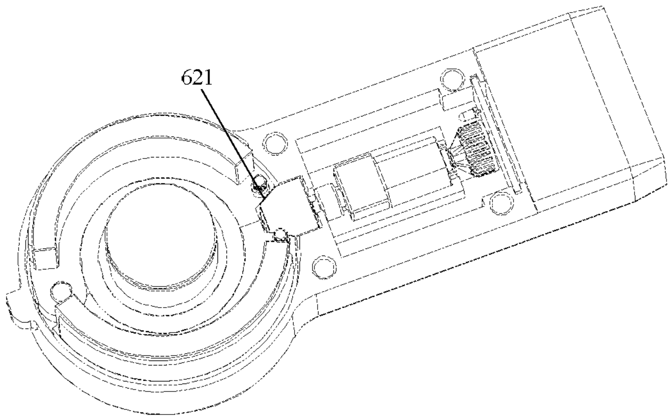
FIG. 4 is a schematic diagram of a stress slope surface and a force applying slope surface in the exoskeleton joint self-locking mechanism of the present invention.
Figure 5:
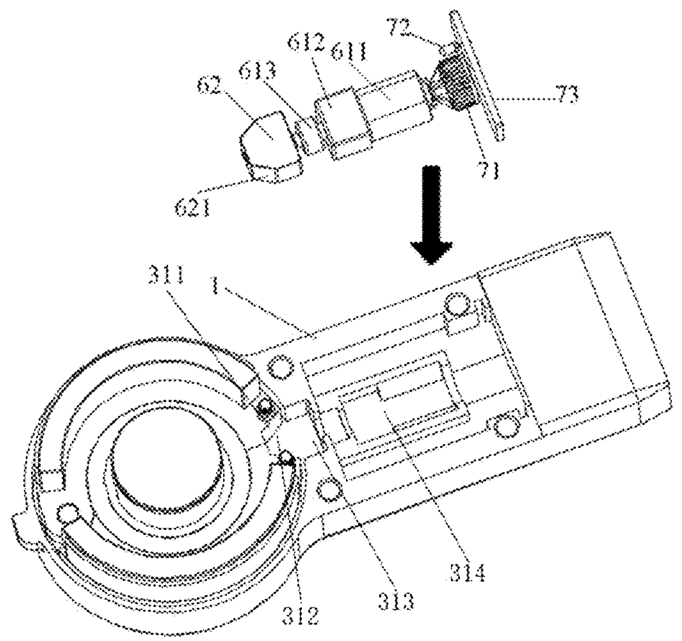
FIG. 5 is a structural diagram of a driving motor in the exoskeleton joint self-locking mechanism of the present invention.

However, it is worth mentioning that there are three methods of setting the acting surfaces of the first rotating frame 31 and the second rotating frame 32 (only one is emphatically illustrated in the present example in conjunction with the accompanying drawings):

1. The first rotating frame 31 is provided with a stress slope surface 311, and the telescopic locking portion is provided with a corresponding one of the stress slope surface 311 at a position corresponding to the first rotating frame 31. In this way, the telescopic locking portion is pushed away from the first rotating frame 31 so that a friction force is generated between the first friction surface 30 on the first rotating frame 31 and the second base 2 to realize self-locking.
2. Similarly, the second rotating frame 32 is provided with a stress slope surface, and the telescopic locking portion is provided with a corresponding one of the stress slope surface at a position corresponding to the second rotating frame 32. In this way, the telescopic locking portion is pushed away from the second rotating frame 32 so that a friction force is generated between the first friction surface 30 on the second rotating frame 32 and the second base 2 to realize self-locking.
3. Referring to FIG. 4 and as described above, both the first rotating frame 31 and the second rotating frame 32 are provided with the stress slope surfaces, which can symmetrically or asymmetrically correspond to each other. Taking FIG. 5 as an example, the first rotating frame and the second rotating frame define an equilateral inverted trapezoidal space 312. Specifically, the inverted trapezoidal space 312 is formed between the stress slope surface of the first rotating frame 31 and the stress slope surface of the second rotating frame 32, a shape of the telescopic locking portion matches with the inverted trapezoidal space 312, and the inverted trapezoidal space 312 defined by the first rotating frame 31 and the second rotating frame 32 can make the force more uniform.

Overall, the third method works best when implemented in concrete terms—the force applied during self-locking is uniform, and the first rotating frame 31 and the second rotating frame 32 are symmetrically and stably extended, but it does not mean that the first and second methods cannot achieve the self-locking effect; although not accompanied by specific illustrations, but those skilled in the art should be able to draw the structure without a doubt.

It is also worth mentioning the forms of the first friction surface 30 and the second friction surface 20, and the following three types are described in this example:

1. The first friction surface 30 is defined by an outer wall surface of the first rotating frame 31 and an outer wall surface of the second rotating frame 32, the outer wall of which may be provided with a friction pattern or the like, and the second friction surface 20 is likewise provided with a friction pattern of the inner wall;
2. The first friction surface 30 and the second friction surface 20 can be provided to be made of special materials, such as nylon products and rubber products, and are correspondingly attached to the first rotating frame 31, the second rotating frame 32 and the first base 1; and
3. The first friction surface 30 is provided by the first friction member. Specifically, the outer side of the first rotating frame 31 and the outer side of the second rotating frame 32 are provided with slots, and two first friction members are mounted in corresponding slots of the first rotating frame 31 and the second rotating frame 32. Preferably, the first friction surface 30 is selected as brake pad 33 by test; further, the second friction surface 20 may be provided in the first or second of the above-described types.

In this embodiment, emphasis is placed on the third type, but it does not mean that the first and second types cannot implement and achieve the effect of friction self-locking. Although specific illustrations are not attached, those skilled in the art should be able to draw the structure without a doubt.

Further, the first base 1 is also provided with a chute 313 which is used to cooperate with the telescopic locking portion to achieve telescoping in the sense of mechanical structure. The locking driving member is a power of the self-locking mechanism. Preferably, the locking driving member includes a driving motor 61, and the telescopic locking portion is a locking slider 62 disposed in the chute 313; a driving end of the driving motor 61 is provided with a threaded segment 614, the locking slider 62 is provided with a threaded groove, and the threaded segment 614 is inserted into the threaded groove. Specifically, the locking slider 62 cannot rotate axially along with the threaded segment 614 in the chute 313, so the threaded segment 614 acts as a lead screw here, and drives the locking slider 62 to reciprocate in the chute 313 by the direction of self-rotation. The driving motor 61 is enabled to accurately adjust the rotation of the threaded segment 614 through a reduction gearbox 612, thereby accurately adjusting the advance and retreat of the locking slider 62, so that the whole self-locking process is accurate, smooth and natural.

Human joints are often the joints of two limbs, which cooperate with the relative rotation of two limbs. As a preferred embodiment of the present example, referring to FIGS. 1, 2 and 3, the second base 2 is mounted on the first base 1 by a mounting mechanism, the mounting mechanism comprises a mounting groove, a bearing 52 and a rotating shaft 51. Specifically, the mounting groove is provided on the second base 2, an outer ring of the bearing 52 is fixedly mounted in the mounting groove; the rotating shaft 51 is disposed in the first compartment 12 of the first base 1, and the inner ring of the bearing 52 is fixedly mounted on the rotating shaft 51. Preferably, the mounting groove may also be provided as a through groove described in FIG. 2, and then a clamp spring 53 is used for further fixed mounting. Such the structure facilitates the relative rotation of the first base 1 and the second base 2 without axial translocation, and the rotation is smooth and stable.

As a preferred embodiment of the present example, the free end of the first rotating frame 31 and the free end of the second rotating frame 32 are connected to each other through an elastic return member 34, which helps the first rotating frame and the second rotating frame to quickly disengage from the first base.

Further, the elastic return member 34 is preferably an extension spring, or an elastic resin or rubber can be selected. The purpose of the elastic return member is to reset and stretch the first rotating frame 31 and the second rotating frame 32, and everything that can achieve this purpose should be included in the selection range of the elastic return member.

It is worth mentioning that, when the elastic return member 34 is not used, the joint rotation can be realized when the locking driving member is unlocked, but the addition of the elastic return member 34 makes the solution better.

As a preferred embodiment of the present example, referring to FIGS. 4, 5, 6 and 7, the driving motor 61 specifically comprises a miniature DC motor 611, a reduction gearbox 612, and a mounting bearing 613. The reduction gearbox 612 is mounted on the miniature DC motor 611, a position of the driving shaft is limited by the mounting bearing 613, and the entire driving motor 61 is mounted in the first base 1 in the form of mounting groove. The first base 1 is provided with groove whose shape and position are adapted to the driving motor 61 to fit the mounting limit. The driving motor is clamped in the form of groove in the prior art, so a redundant description is not made.

As a preferred embodiment of the present example, referring to FIG. 2, the present invention also includes an outer cover plate 4, which is mounted on the first base 1 and used to cover the driving motor 61 and other components. The outer cover plate 4 is disposed in a "post and slot" manner. The first base 1 is provided with a slot, and then the outer cover plate 4 is provided with a post, which is inserted into the slot for limiting, and then a bolt through hole connection or screw punch hole connection is made.

By adopting the above technical solution, the present invention has the following technical effects:

1. A structure of the motor group or hydraulic cylinder can be omitted, and the self-locking is realized by friction. A magnitude of the friction depends on the pressure on the one hand and depends on friction coefficient on the other hand, so the power demand is not high, which can reduce the overall power consumption, prolong the useful time of the battery, improve the overall endurance, and also reduce the weight and cost of the whole machine.
2. The self-locking mechanism is widely used because of its compact structure and small size, which can be applied to the self-locking of the knee joint or other places, and is not limited to exoskeleton robots.

Figure 8:
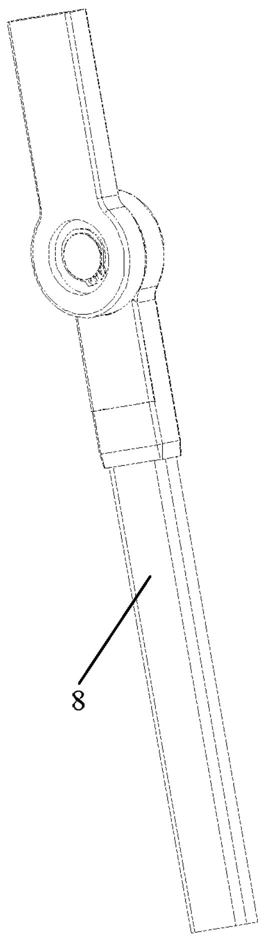
FIG. 8 is a structural diagram of an exoskeleton knee joint of the present invention.
Figure 9:
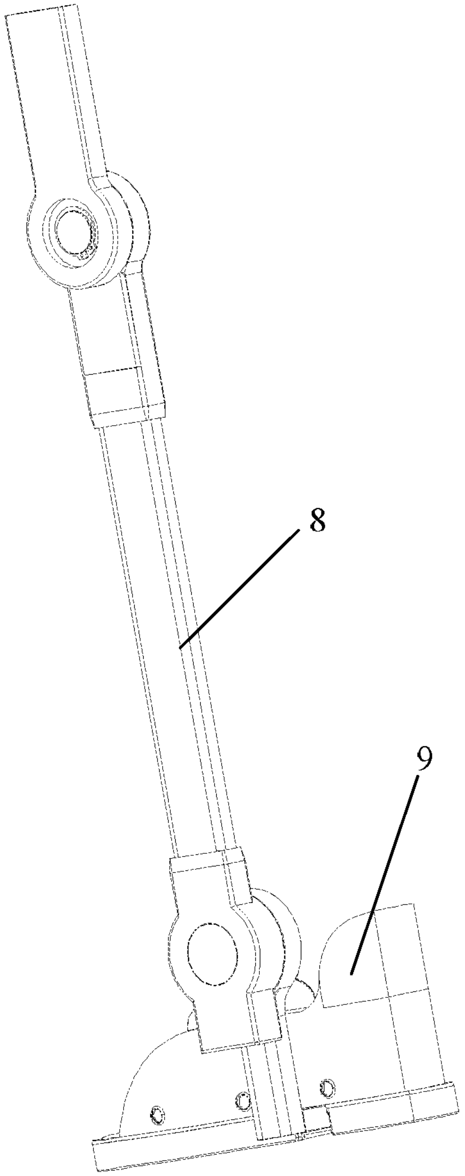
FIG. 9 is a structural schematic diagram of an exoskeleton bionic rehabilitation robot of the present invention.
Figure 10:
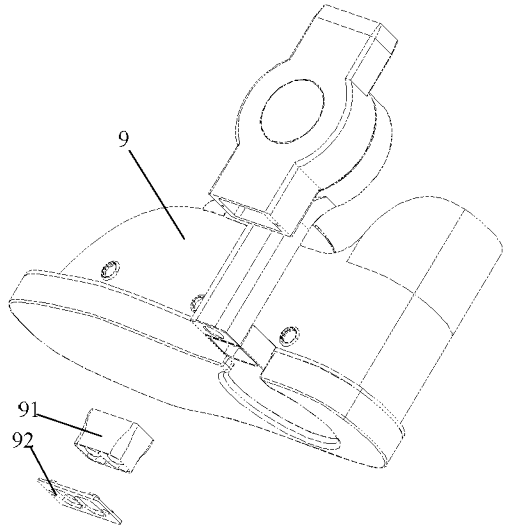
FIG. 10 is a structural schematic diagram of an ankle-foot component in the exoskeleton bionic rehabilitation robot of the present invention.

Referring to FIG. 8, the present invention also provides an exoskeleton knee joint, which comprises a shank connecting rod 8, a thigh connecting rod and the above exoskeleton joint self-locking mechanism. The shank connecting rod 8 is connected to the first base 1, and the thigh connecting rod is connected to the second base 2. The self-locking mechanism is disposed at the knee joint, which can start the locking driving member to complete the self-locking to assist standing when standing, and can unlock when walking to complete the activities at the knee joint.

Referring to FIG. 9 to FIG. 13, which is to be read in conjunction with FIG. 1 to FIG. 5, the present invention also provides an exoskeleton bionic rehabilitation robot, which includes the above exoskeleton knee joint and an ankle-foot component 9, and the ankle-foot component 9 is connected to the shank connecting rod 8 of the exoskeleton knee joint. As mentioned above, the locking driving member can be started to complete self-locking to assist standing when standing, and the activities at the knee joint can be unlocked when walking.

Figure 11:
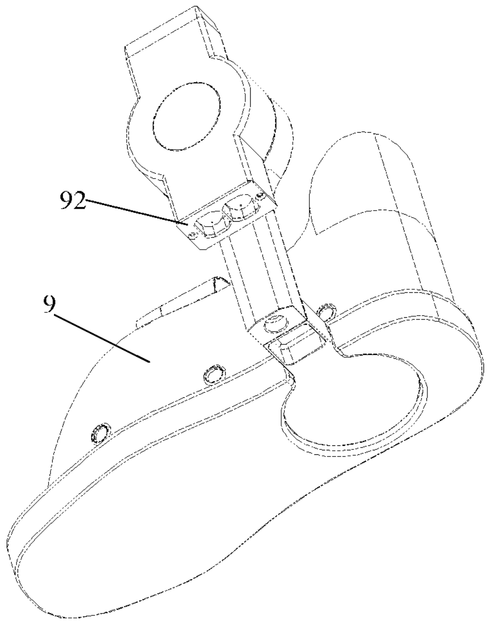
FIG. 11 is an assembly diagram of the ankle-foot component in the exoskeleton bionic rehabilitation robot of the present invention.
Figure 12:
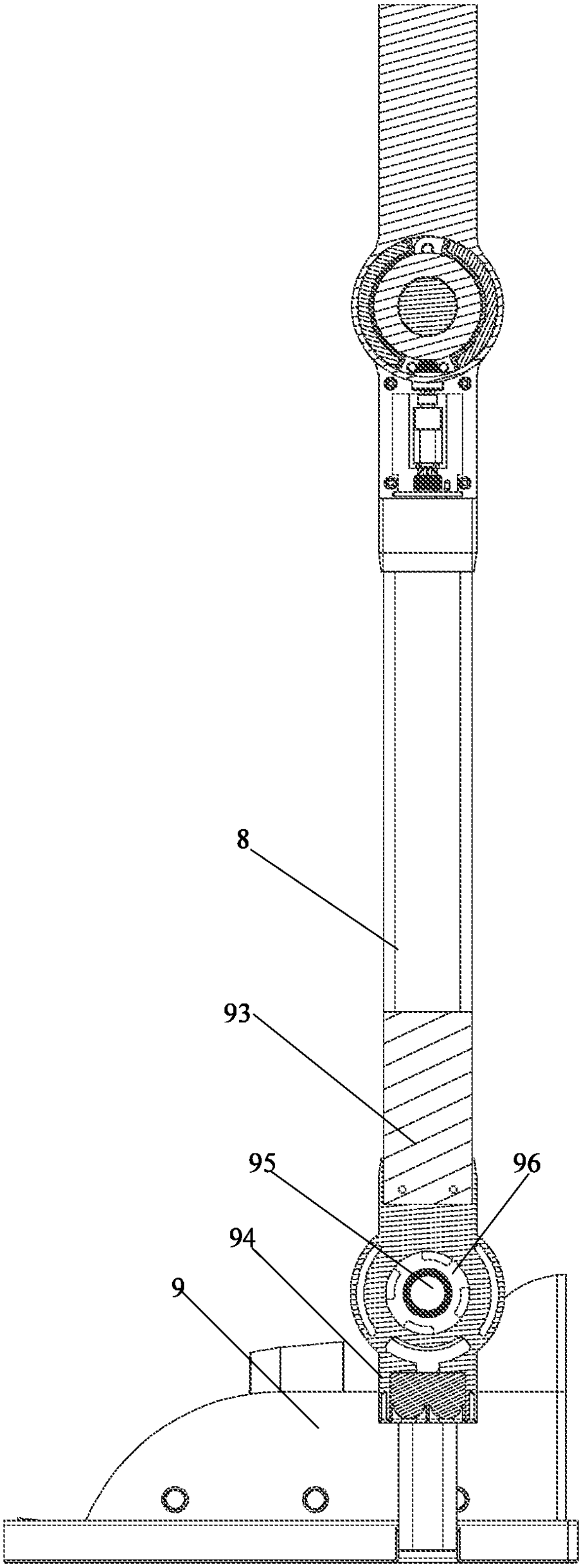
FIG. 12 is a whole sectional view of the exoskeleton bionic rehabilitation robot of the present invention.
Figure 13:
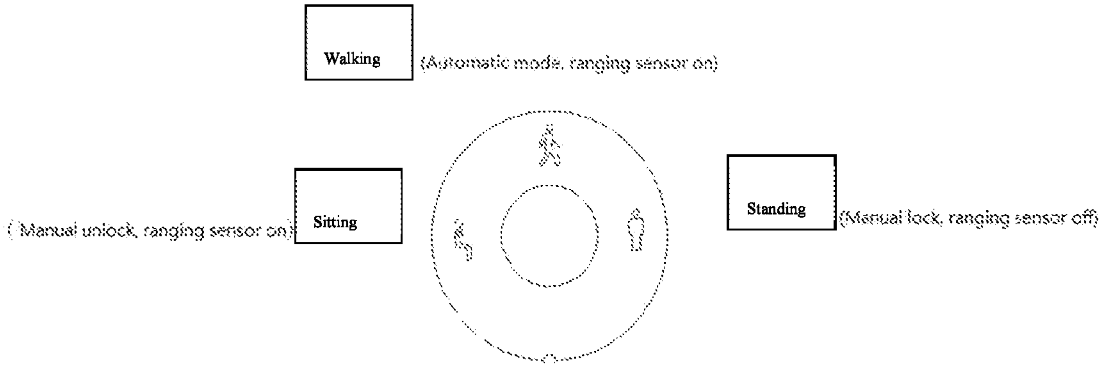
FIG. 13 is a functional schematic diagram of a remote control of the exoskeleton bionic rehabilitation robot of the present invention.

The following is described in detail by way of specific embodiments in conjunction with the accompanying drawings:

Referring to FIGS. 11 and 12, in order to improve the use experience of patients, as a preferred embodiment of this example, the present invention also includes a control unit, which comprises a control motherboard 73 and a ranging sensor 91, wherein the control motherboard 73 is in control connection to the locking driving member; the ranging sensor 91 is provided on the ankle-foot component 9 to measure a distance between the ankle-foot component 9 and a walking surface, and the ranging sensor 91 is in signal connection to the control motherboard 73. A distance between the foot and the walking surface (i.e., the ground) is measured to determine whether the leg walks or stands. When standing, the distance between the ranging sensor 91 and the walking surface is the smallest, then self-locking is realized to assist standing; and when the distance between the ranging sensor 91 and the walking surface becomes larger, it is in the state of walking or preparing to walk, and activities of the knee joint are completely by the progressive unlocking.

As shown in FIG. 11, the ankle-foot component 9 and the shank connecting rod 8 are also rotationally connected, and the connection mode is similar to that of the first base 1 and the second base 2 in structure. Specifically, a third base 93 is disposed on the shank connecting rod 8, a fourth base 94 is disposed on the ankle-foot component 9, an ankle-foot rotating shaft 95 is disposed on the third base 93, an ankle-foot bearing 96 is disposed on the fourth base 94, and the fourth base 94 is mounted on the third base 93 through the ankle-foot component 9.

Preferably, the ranging sensor 91 is mounted at one end of the third base 93 facing the walking surface, and the ranging sensor 91 mounted inside the third base 93 is fixed with a ranging sensor bracket 92, which does not block the ranging sensing of the ranging sensor 91.

Further, the present invention also includes a remote control, which is provided with a basic function control module to communicate with the control motherboard 73. As an external manifestation and control form of a control unit, its technology is only the standard component of the preset program, and no redundant explanation will be made here; specifically, it implements the following functions:

Referring to FIGS. 11 and 12, when switching to a "sitting" mode, the ranging sensor 91 is turned off instantly, then the driving motor 61 is automatically reset and the locking slider 62 is retreated to a bottom end, under the action of the elastic return member 34 (extension spring), the first rotating frame 31 and the second rotating frame 32 are rotationally attached along a pivot shaft; at the same time, two brake pads 33 on each of the first rotating frame 31 and the second rotating frame 32 are driven to rotate and form a clearance fit with the inner wall of the second base 2 of the thigh connecting rod. At this time, the first base 1 and the second base 2 can be unlocked and rotated freely. But the first base 1 and the second base 2 are provided with rotation angle mechanical limits. The rotation angle mechanical limit means that when the joint stands at 180°, the first base 1 and the second base 2 are limited to each other by an angle limiting block 11 (the angle limiting block on the first base 1 is illustrated, the second base 2 is also provided with an angle limiting block without any illustration, but its position corresponds to that on the first base 1, so it can be undoubtedly concluded that the two angle limiting blocks 11 are abutted against each other when the joint stands at) 180°, to ensure that the patient can only move within the ergonomic angle range and prevent the anti-joint rotation from bringing secondary injury to the patient. At this time, the patient can complete a sitting activity.

When the patient is lifted, it switches to a "standing" mode, the ranging sensor 91 is still not turned on, the driving motor 61 works rapidly to push the locking slider 62 to a maximum displacement of a top end, the first rotating frame 31 and the second rotating frame 32 are pushed by the locking slider 62 and quickly open, and at the same time, the two brake pads 33 squeeze and rub the inner wall of the second base 2 and lock the second base 2 and the rotating outward expanding locking member, thereby realizing the locking of the second base 2 and the first base 1, locking the rotational freedom and realizing the patient's assisted standing.

When switching to a "walking" mode, the ranging sensor 91 is activated for operation. Before standing and walking, the left and right knee joint self-locking mechanisms are locked and prohibited from rotating to support human body weight. At the beginning of walking, when the center of gravity of the human body moves to the right leg, the left thigh rotates and rises, which drives the shank and ankle joint to rise. The ranging sensor 91 detects a change of an initial distance value, feeds back and starts the driving motor 61 to work in time, and the locking slider 62 returns to drive the brake pad 33 to reset, thus unlocking the left knee joint to complete knee bending. Then, the patient slowly shifts the center of gravity forward to the left leg. During the falling of the left shank and ankle joint, the ranging sensor 91 detects that the distance value decreases and gradually recovers to the initial value. The driving motor 61 is started again to push the locking slider 62, and the friction force is slowly increased before the left foot lands until it is completely locked and supports the human body weight when landing.

The left leg's support and the right leg's walking share the same principle of action, so the cycle is repeated to complete the walking action and help the rehabilitation of the patient's lower limbs.

Further, the ranging sensor 91 includes, but is not limited to, an infrared ranging sensor 91, a laser ranging sensor 91, an ultrasonic ranging sensor 91 and a radar ranging sensor 91. The ranging sensor 91 is designed to measure the distance between the ankle-foot component and the walking surface to determine whether the leg is standing or lifting from the ground to prepare for walking.

Figure 6:
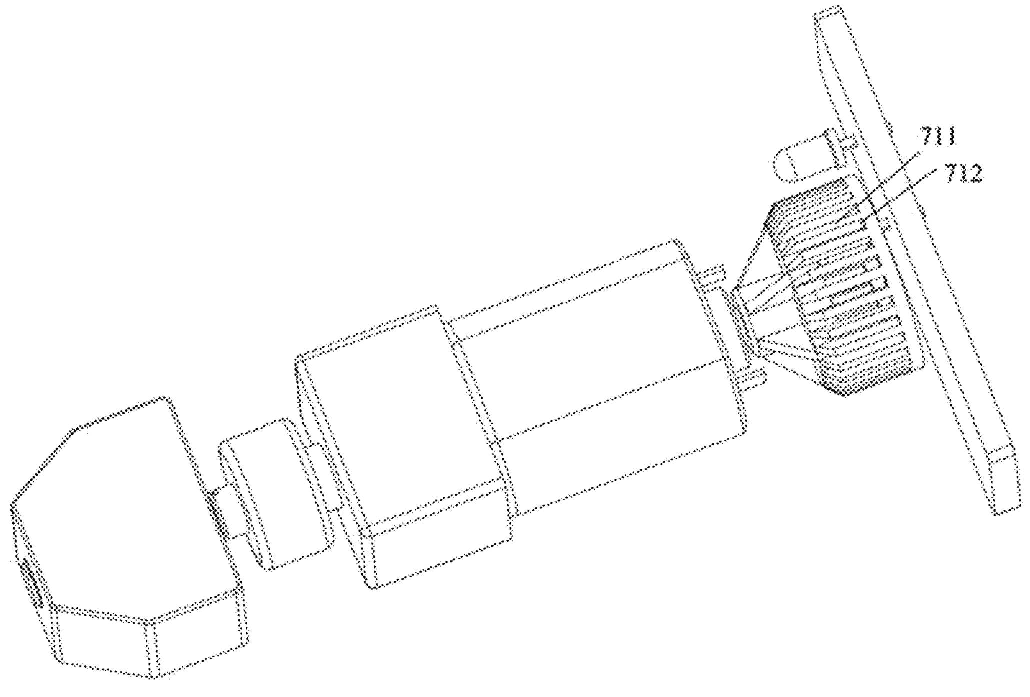
FIG. 6 is a structural diagram of a measuring turntable in the exoskeleton joint self-locking mechanism of the present invention.
Figure 7:
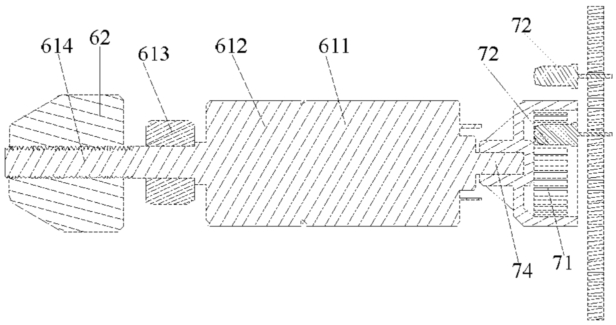
FIG. 7 is a sectional view of the driving motor in the exoskeleton joint self-locking mechanism of the present invention.

Further, referring to FIGS. 6 and 7, the exoskeleton bionic rehabilitation robot also includes a locking measuring mechanism, which comprises a synchronous shaft 74, a signal transmitter, a signal receiver and a measuring turntable; wherein the synchronous shaft 74 rotates synchronously with the driving shaft of the driving motor 61; the signal transmitter and the signal receiver are arranged opposite to each other at intervals; a rotation center of the measuring turntable is connected to the synchronous shaft 74, and an edge of the measuring turntable is cyclically provided with a signal masked area 711 and a signal unmasked area 712; and the measuring turntable rotates with the synchronous shaft 74 to circularly block/switch on the signal connection between the signal transmitter and the signal receiver. By synchronizing the driving shaft with the synchronous shaft 74, the measuring turntable also rotates, a number of times that the signal transmitter and signal receiver go through the signal masked area and a signal unmasked area till realizing the self-locking state is counted, so that an angle at which the measuring turntable has turned can be read and recorded, which can prevent the excessive rotation of the driving motor 61 from damaging other parts, and can also control the time to reach this angle, so that a speed of self-locking can be controlled, and the bionic real knee joint movement can be improved for comfort and safety.

As a preferred embodiment of the present example, the signal transmitter and the signal receiver are a set of infrared transceiver photodiode pairs 72. Further, the measuring turntable is a raster encoder 71.

To control the feed stroke of the slider and realize the adjustable and controllable friction force, the raster encoder 71 and the infrared transceiver photodiode pairs 72 are introduced for counting, which can give electrical signals when the contact is disconnected or connected through infrared communication. When the driving motor 61 drives the raster encoder 71 to rotate from the initial position, the infrared communication between the pairs and the raster encoder is blocked every certain rotation angle. By counting the number of times that the communication is blocked, the rotation angle of the synchronous shaft can be calculated. The rotation angle of the synchronous shaft needed to realize complete unlocking and locking of the knee joint can be obtained by calculation or test. When the rotation angle of the driving motor 61 reaches this value, a signal can be given by the control circuit to stop the rotation of the driving motor 61, to completely unlock and lock the knee joint. At the same time, by limiting the maximum rotation angle of the driving motor 61, damage to the motor and the mechanical structure can also be prevented. Since the reduction gearbox 612 is provided, the numerical difference between the rotation angle of the raster encoder 71 and the feed distance of the locking slider 62 can be amplified, and the control accuracy can be improved. On the other hand, since the unlocking-locking of the knee joint is controlled by the friction force between the brake pad 33 and the inner wall of the second base 2, it is possible to control the magnitude and change rate of this friction force by controlling the feed speed and the feed stroke of the locking slider 62, and to realize the switching between the unlocking, partial locking and locking states of the knee joint. A buffer state of partial locking is introduced between locking and unlocking states; in this state, the friction force is partially retained, the joint rotation rate is limited, the danger caused by sudden state change is eliminated, and the bionic real knee joint movement can be improved for comfort and safety.

Further, the driving motor 61 is a coaxial motor, and the synchronous shaft 74 and the driving shaft of the driving motor 61 are disposed to be coaxial but at different ends.

By adopting the above technical solution, the present invention has the following technical effects:

1. The present invention uses the motor to drive the locking slider to change the friction force between the brake pad and the friction surface to control the unlocking and locking of the knee joint. Compared with the prior art, which uses the friction force between the torsion spring and the friction surface to generate torque, the present invention is more reliable and durable, and is easier to maintain and replace in structure.
2. The present invention can control the change amount and speed of friction force between the brake pad and friction surface by controlling the rotation speed and rotation number of motor, to realize the function of gradually changing friction force and retaining partial friction force. However, in the prior art, the friction force changes sharply when the knee joint is opened and closed. Therefore, the present invention is more comfortable and safe for the wearer and has bionic characteristics.
3. In the prior art, the swing angle of the wearer's thigh is measured by an angle sensor to control the unlocking and locking of the knee joint. The present invention uses a ranging sensor to control the unlocking and locking of the knee joint by measuring the lifting or lowering of the ankle, which enlarges the measuring interval and is more sensitive to slight changes.
4. The present invention can manually control the unlocking and locking of the knee joint by means of remote control and the like, to protect the wearer in the process of sitting down, standing up and standing, save electric energy, and can also automatically control the knee joint to unlock and lock at different stages of walking during the wearer's walking, to imitate the state of the knee joint when human beings walk, which makes the exoskeleton movement more natural and comfortable.
5. The present invention adopts the way of controlling the friction force to lock and unlock the knee joint, so that the unlocking and locking of the knee joint are not completed instantaneously, but is gradually locked and unlocked with the increase and decrease of the friction force, which is more in line with the walking habits of the wearer and safer.
6. The present invention has the advantages of compact structure, small size, low energy consumption and prolonged endurance.

It should be noted that the "I" involved in the expression in the description is an optional meaning, which is interpreted as the meaning of "or". The structure, proportion, size, etc. shown in the drawings of this description are only used to cooperate with the contents disclosed in the description, for those skilled in the art to understand and read; it is not intended to limit the conditions under which the present invention can be implemented, so it has no technical significance. Any modification of structure, change of proportional relationship, or adjustment of size should still fall within the scope of the technical content disclosed by the present invention without affecting the effect and purpose achieved by the present invention. Meanwhile, the terms such as "upper", "lower", "left", "right", "middle" and "one" used in this description are for ease of description only, and are not intended to limit the practicable scope of the present invention. Changes or adjustments in their relative relations are also regarded as the practicable scope of the present invention without substantial changes in technical contents.

Various changes may be made to the present invention by ordinary technicians skilled in the art based on the above description. Thus, certain details in the embodiments are not intended to limit the present invention without violating the essence of the claims of the present invention, and the present invention is to be protected within the scope defined in the appended claims.

What is claimed is:

1. An exoskeleton joint self-locking mechanism, characterized in comprising:

a first base having a first compartment;

a rotating outward expanding locking member disposed in the first compartment, the rotating outward expanding locking member comprising a first rotating frame and a second rotating frame, and an outer side of the first rotating frame and an outer side of the second rotating frame correspondingly having a first friction surface; each of one end of the first rotating frame and one end of the second rotating frame is provided with a lug, the lug defines a hole, and two lugs are stacked together and inserted and mounted by a pivot mounting shaft, and another end of the first rotating frame and another end of the second rotating frame being relatively free ends;

a second base having a second compartment; the second base being rotationally mounted on the first base, and an inner wall of the second compartment enclosing the rotating outward expanding locking member and defining a second friction surface matching with the first friction surface; and a locking driving member capable of applying/removing a force pushing away from the free end of the first rotating frame and the free end of the second rotating frame, to make the first friction surface close contact to lock/unlock the second friction surface; further, the free end of the first rotating frame and/or the free end of the second rotating frame being correspondingly provided with a stress slope surface, the locking driving member comprising a driving motor and a telescopic locking portion, the telescopic locking portion having a force applying slope surface, and the force applying slope surface applying force to the stress slope surface along with the telescopic locking portion, wherein the driving motor comprises a miniature direct current (DC) motor, a reduction gearbox, and a mounting bearing, the reduction gearbox is mounted on the miniature DC motor, the driving motor is mounted in the first base, and the first base defines a groove adapted to the driving motor in shape and position to mount and limit the driving motor.

2. The exoskeleton joint self-locking mechanism of claim 1, wherein an inverted trapezoidal space is formed between the stress slope surface of the first rotating frame and the stress slope surface of the second rotating frame, and a shape of the telescopic locking portion matches with the inverted trapezoidal space.

3. The exoskeleton joint self-locking mechanism of claim 1, wherein the first base is further provided with a chute, and the telescopic locking portion is a locking slider disposed in the chute; a driving end of the driving motor is provided with a threaded segment, the locking slider is provided with a threaded groove, and the threaded segment is inserted into the threaded groove.

4. An exoskeleton knee joint, characterized in comprising a shank connecting rod, a thigh connecting rod and the exoskeleton joint self-locking mechanism of claim 3; the shank connecting rod is connected to the first base, and the thigh connecting rod is connected to the second base.

5. An exoskeleton bionic rehabilitation robot, characterized in comprising the exoskeleton knee joint of claim 4 and an ankle-foot component which is connected to the shank connecting rod of the exoskeleton knee joint.

6. The exoskeleton bionic rehabilitation robot of claim 5, wherein the exoskeleton bionic rehabilitation robot further comprises a control unit comprising:

a control motherboard being in control connection to the locking driving member; and a ranging sensor disposed on the ankle-foot component to measure a distance between the ankle-foot component and a walking surface, and the ranging sensor being in signal connection to the control motherboard.

7. The exoskeleton bionic rehabilitation robot of claim 6, wherein the ranging sensor includes, but is not limited to, an infrared ranging sensor, a laser ranging sensor, an ultrasonic ranging sensor, and a radar ranging sensor.

8. The exoskeleton bionic rehabilitation robot of claim 6, wherein the exoskeleton bionic rehabilitation robot further comprises a locking measuring mechanism comprising:

a synchronous shaft rotating synchronously with a driving shaft of the driving motor;

a signal transmitter and a signal receiver arranged opposite to each other at intervals;

a measuring turntable, a rotation center of the measuring turntable being connected to the synchronous shaft, and an edge of the measuring turntable being alternately provided with a signal masked area and a signal unmasked area; and the measuring turntable rotating with the synchronous shaft to circularly block/switch on the signal connection between the signal transmitter and the signal receiver.

9. The exoskeleton bionic rehabilitation robot of claim 8, wherein the signal transmitter and the signal receiver are a set of infrared transceiver photodiode pairs.

10. The exoskeleton bionic rehabilitation robot of claim 9, wherein the measuring turntable is a raster encoder.

11. The exoskeleton bionic rehabilitation robot of claim 8, wherein the driving motor is a coaxial motor, and the synchronous shaft and the driving shaft of the driving motor are configured to be coaxial but at two different ends.

12. The exoskeleton bionic rehabilitation robot of claim 6, wherein the ankle-foot component and the shank connecting rod are rotationally connected, the shank connecting rod is provided a third base thereon, the ankle-foot component is provided a fourth base thereon, an ankle-foot rotating shaft is disposed on the third base, an ankle-foot bearing is disposed on the fourth base, and the fourth base is mounted on the third base through the ankle-foot component.

13. The exoskeleton bionic rehabilitation robot of claim 12, wherein the ranging sensor is mounted at one end of the third base facing the walking surface.

14. The exoskeleton joint self-locking mechanism of claim 1, wherein the second base is mounted to the first base through a mounting mechanism, and the mounting mechanism comprises:

a mounting groove provided on the second base;

a bearing, an outer ring of the bearing being fixedly mounted in the mounting groove; and a rotating shaft disposed in the first compartment of the first base, and an inner ring of the bearing being fixedly mounted on the rotating shaft.

15. The exoskeleton joint self-locking mechanism of claim 1, wherein the free end of the first rotating frame and the free end of the second rotating frame are connected to each other through an elastic return member.

16. The exoskeleton joint self-locking mechanism of claim 1, further comprising:

a clamp spring, wherein the bearing is fixedly mounted in the mounting groove through the clamp spring.

* * * * *